(12) United States Patent
Onodera

(10) Patent No.: US 11,514,269 B2
(45) Date of Patent: Nov. 29, 2022

(54) IDENTIFICATION DEVICE, ROBOT, IDENTIFICATION METHOD, AND STORAGE MEDIUM

(71) Applicant: CASIO COMPUTER CO., LTD., Tokyo (JP)

(72) Inventor: Yutaka Onodera, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 410 days.

(21) Appl. No.: 16/591,538

(22) Filed: Oct. 2, 2019

(65) Prior Publication Data
US 2020/0110968 A1 Apr. 9, 2020

(30) Foreign Application Priority Data
Oct. 4, 2018 (JP) .............................. JP2018-188897

(51) Int. Cl.
G06K 9/62 (2022.01)
G06N 20/00 (2019.01)
G10L 17/10 (2013.01)
G06N 3/00 (2006.01)
G06V 40/70 (2022.01)
G06V 40/16 (2022.01)

(52) U.S. Cl.
CPC ........... *G06K 9/6262* (2013.01); *G06N 3/008* (2013.01); *G06N 20/00* (2019.01); *G06V 40/172* (2022.01); *G06V 40/70* (2022.01); *G10L 17/10* (2013.01)

(58) Field of Classification Search
CPC .... G06K 9/6262; G06K 9/00288; G06K 9/00; G06K 9/00892; G06K 9/62; G10L 17/10; G06N 20/00; G06N 3/08; G06N 3/008; G06N 3/00
See application file for complete search history.

(56) References Cited

U.S. PATENT DOCUMENTS

| 2007/0075996 | A1* | 4/2007 | Toyama .................. G06T 17/00 345/419 |
| 2010/0198598 | A1 | 8/2010 | Herbig et al. |
| 2014/0350924 | A1 | 11/2014 | Zurek et al. |
| 2017/0200093 | A1* | 7/2017 | Motahari Nezhad ... G06F 40/30 |

FOREIGN PATENT DOCUMENTS

| JP | 2006263348 A | 10/2006 |
| JP | 2007156974 A | 6/2007 |

OTHER PUBLICATIONS

Japanese Office Action (and English language translation thereof) dated Jul. 26, 2022, issued in counterpart Japanese Application No. 2018-188897.

* cited by examiner

*Primary Examiner* — Tuan H Nguyen
(74) *Attorney, Agent, or Firm* — Holtz, Holtz & Volek PC

(57) ABSTRACT

An identification device has a processor configured to carry out plural identification processing by which an individual is identified based on plural acquired data different from each other indicating the individual and, when the identification of the individual by one or more identification processing of the plural identification processing fails and the identification of the individual by one or more other identification processing of the plural identification processing succeeds, learn the at least one identification processing by which the identification of the individual fails.

13 Claims, 9 Drawing Sheets

FIG. 4

LEARNING DATA STORAGE PORTION  190

| ID | NAME | FACE LEARNING DATA | FACE IDENTIFICATION DATA |
|    |      | VOICE LEARNING DATA | VOICE IDENTIFICATION DATA |
| 001 | AAA | DATA A01 | DATA A03 |
|     |     | DATA A02 | DATA A04 |
| 002 | BBB | DATA B01 | DATA B03 |
|     |     | DATA B02 | DATA B04 |
| 003 | CCC | DATA C01 | DATA C03 |
|     |     | DATA C02 | DATA C04 |
| ⋮ | ⋮ | ⋮ | ⋮ |

FIG. 5

LEARNING DATA STORAGE PORTION  190

| ID | NAME | FACE LEARNING DATA | FACE IDENTIFICATION DATA |
|    |      | VOICE LEARNING DATA | VOICE IDENTIFICATION DATA |
| 001 | AAA | DATA A11 | DATA A13 |
|     |     | DATA A02 | DATA A04 |
| 002 | BBB | DATA B01 | DATA B03 |
|     |     | DATA B02 | DATA B04 |
| 003 | CCC | DATA C01 | DATA C03 |
|     |     | DATA C02 | DATA C04 |
| ⋮ | ⋮ | ⋮ | ⋮ |

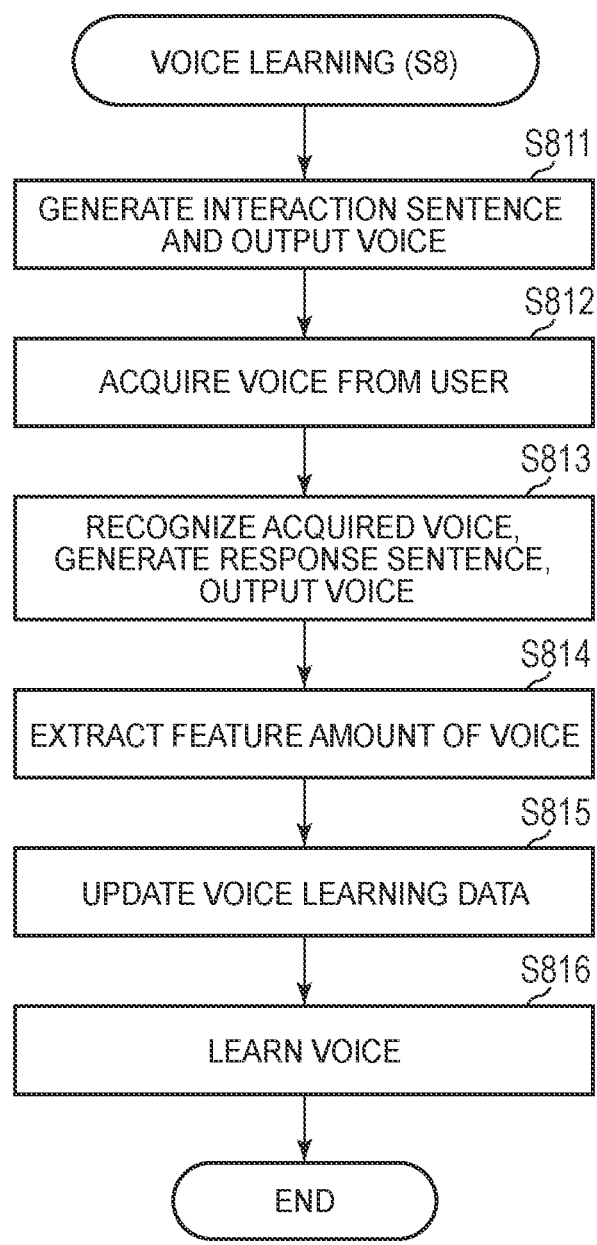

FIG. 11

LEARNING DATA STORAGE PORTION 190a

| ID | NAME | PERIOD | FACE LEARNING DATA / VOICE LEARNING DATA | FACE IDENTIFICATION DATA / VOICE IDENTIFICATION DATA |
|---|---|---|---|---|
| 001 | AAA | SPRING | DATA A01 | DATA A03 |
| | | | DATA A02 | DATA A04 |
| | | PERIODS OTHER THAN SPRING | DATA A11 | DATA A13 |
| | | | DATA A12 | DATA A14 |
| 002 | BBB | SPRING | DATA B01 | DATA B03 |
| | | | DATA B02 | DATA B04 |
| | | PERIODS OTHER THAN SPRING | DATA B11 | DATA B13 |
| | | | DATA B12 | DATA B14 |
| 003 | CCC | SPRING | DATA C01 | DATA C03 |
| | | | DATA C02 | DATA C04 |
| | | PERIODS OTHER THAN SPRING | DATA C11 | DATA C13 |
| | | | DATA C12 | DATA C14 |
| ⋮ | ⋮ | ⋮ | ⋮ | ⋮ |

IDENTIFICATION DEVICE, ROBOT, IDENTIFICATION METHOD, AND STORAGE MEDIUM

BACKGROUND

1. Field

The present invention relates to an identification device, a robot, an identification method, and a storage medium.

2. Related Art

A technique of identifying an individual is known. For example, Japanese Patent Application Laid-Open No. 2007-156974 discloses an identification device identifying an individual with high accuracy by integrating a face image and a voice. When specifically described, the identification device disclosed in Japanese Patent Application Laid-Open No. 2007-156974 determines a score $\alpha$ indicating the likelihood of being the person by the identification using a face image, determines a score $\beta$ indicating the likelihood of being the person by the identification using a voice, and then compares the determined score $\alpha$ and score $\beta$ with the corresponding threshold values to thereby identify the individual. Moreover, Japanese Patent Application Laid-Open No. 2007-156974 discloses varying the threshold value of the score $\alpha$ and the threshold value of the score $\beta$ according to the brightness or a background noise.

SUMMARY

An identification device according to the present invention has a processor configured to carry out plural identification processing by which an individual is identified based on plural acquired data different from each other indicating the individual and, when the identification of the individual by one or more identification processing of the plural identification processing fails and the identification of the individual by one or more other identification processing of the plural identification processing succeeds, learn the at least one identification processing by which the identification of the individual fails.

BRIEF DESCRIPTION OF THE DRAWINGS

FIG. 4 is a view illustrating examples of data stored in a learning data storage portion in Embodiment 1.

FIG. 5 is a view illustrating examples in which the data stored in the learning data storage portion illustrated in FIG. 4 are updated.

FIG. 10 is a flow chart illustrating the flow of voice learning processing carried out by a robot according to Embodiment 2 of the present invention.

FIG. 11 is a view illustrating examples of data stored in a learning data storage portion in Embodiment 3 of the present invention.

DETAILED DESCRIPTION

Figure 1:
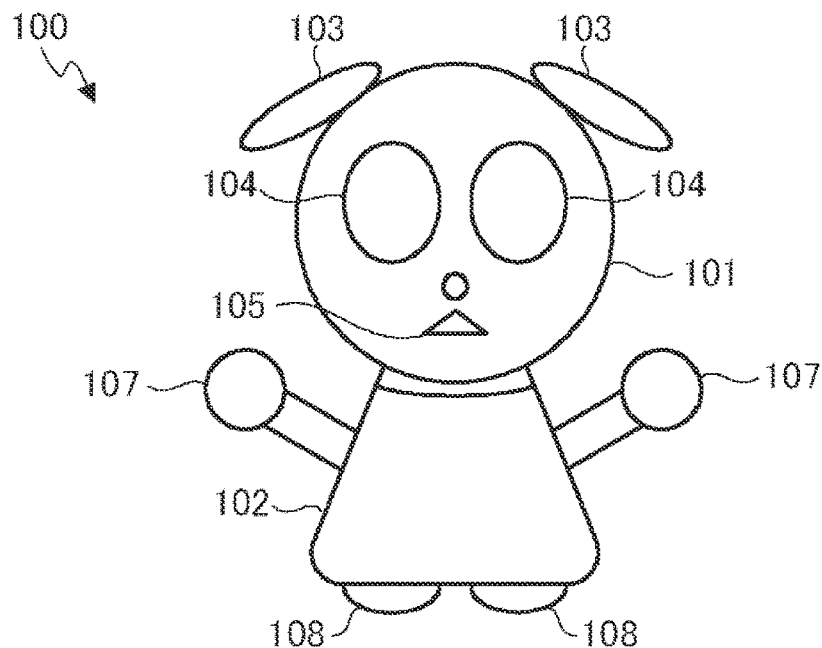
FIG. 1 is a view illustrating the appearance of a robot according to Embodiment 1 of the present invention.

Hereinafter, embodiments of the present invention are described with reference to the drawings. In the figures, the same reference numerals are given to the same or corresponding portions.

Embodiment 1

FIG. 1 illustrates the appearance of a robot 100 according to Embodiment 1 of the present invention. The robot 100 is a communication robot which is mainly used in a home and can communicate with a user. As illustrated in FIG. 1, the robot 100 has a shape imitating an animal (pet) and autonomously moves according to a motion program specified beforehand.

The robot 100 variously moves in response to a stimulus from the outside, such as call or contact from a user present in the outside of the device itself. Thus, the robot 100 can communicate and interact with a user. The user is a partner communicating and interacting with the robot 100 and specifically an owner, a family, a friend, and the like of the robot 100, for example.

As illustrated in FIG. 1, the robot 100 has a three-dimensional shape imitating a small dog in appearance. The robot 100 is produced using a hard synthetic resin, such as plastic, as a main material, for example. The robot 100 is provided with a head portion 101, a body portion 102, ear portions 103, eye portions 104, a mouth portion 105, hand portions 107, and foot portions 108.

The head portion 101, the ear portions 103, the hand portions 107, and the foot portions 108 are portions which can be moved by a driving member built in the robot 100. The head portion 101 is attached to the body portion 102 so as to be rotatable in three directions of a pitch direction, a roll direction, and a yaw direction by a neck joint provided in the neck. The eye portions 104 each are provided with a display portion 117 displaying images (eyeball and the like) relating to eyes. The mouth portion 105 is provided with an imaging portion 115a capturing an image of the front of the robot 100.

Figure 2:
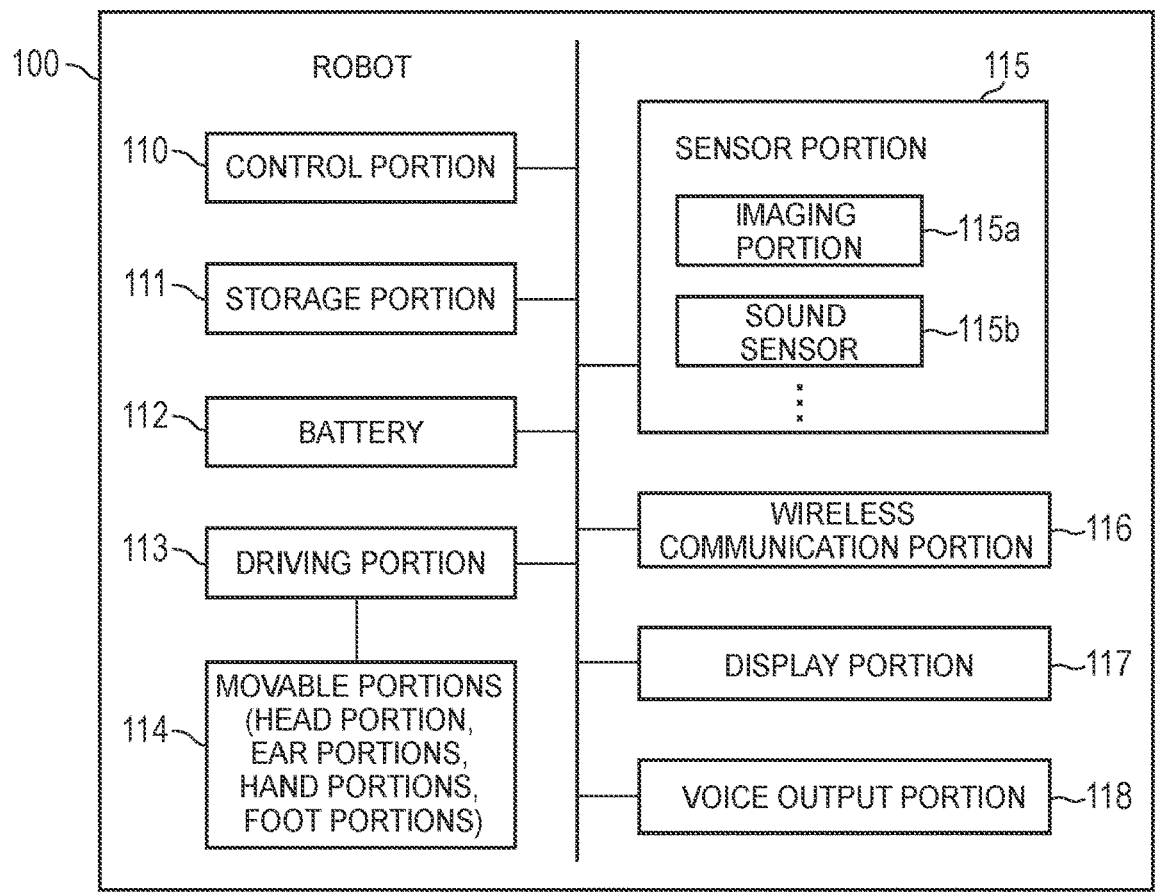
FIG. 2 is a block diagram illustrating the hardware configuration of the robot according to Embodiment 1.

FIG. 2 illustrates the hardware configuration of the robot 100. As illustrated in FIG. 2, the robot 100 is provided with a control portion 110, a storage portion 111, a battery 112, a driving portion 113, movable portions 114, a sensor portion 115, a wireless communication portion 116, a display portion 117, and a voice output portion 118.

The control portion 110 is provided with a CPU (Central Processing Unit), a ROM (Read Only Memory), and a RAM (Random Access Memory). The CPU is a microprocessor or the like, for example, and is a central processing unit carrying out various kinds of processing or arithmetic processing. In the control portion 110, the CPU reads control programs stored in the ROM to control the motion of the entire device itself (robot 100) using the RAM as a work memory.

The control portion 110 contains a processor for image processing, such as a GPU (Graphics Processing Unit), for example, a processor for voice processing, such as a DSP (Digital Signal Processor), for example, and various kinds of buffer memories. The control portion 110 recognizes a person, a face, an object, and the like included in an image captured by the imaging portion 115a using a well-known image recognition technique by the processor for image processing. Moreover, the control portion 110 recognizes a voice detected by a sound sensor 115b using a well-known voice recognition technique by the processor for voice processing.

The storage portion 111 is a nonvolatile memory, such as a flash memory or a hard disk. The storage portion 111 stores programs and data used in order for the control portion 110 to perform various kinds of processing including an OS (Operating System) and application programs. Moreover, the storage portion 111 stores data generated or acquired by performing various kinds of processing by the control portion 110.

The battery 112 is a storage battery for storing electric energy to supply power to each portion of the robot 100. The battery 112 is charged by a charging station when the robot 100 is connected to the charging station.

The driving portion 113 is provided with driving members, such as a motor, an actuator, and the like, driving the movable portions 114 of the robot 100 and a drive circuit driving the driving members. The movable portions 114 are movable parts and specifically the head portion 101, the hand portions 107, and the foot portions 108. The control portion 110 transmits a control signal to the drive circuit based on the motion program. The drive circuit supplies a driving pulse signal to the driving members according to the control signal transmitted from the control portion 110. The driving members drive the movable portions 114 according to the pulse signal supplied from the drive circuit.

The robot 100 can variously move by the drive of the movable portions 114 by the driving portion 113. For example, the robot 100 can move forward or backward and can change the direction of the device itself by moving the foot portions 108. Herein, the foot portions 108 each are provided with a wheel. The position or the direction of the robot 100 may be changed by the rotational drive of the wheels by the driving portion 113. Moreover, the robot 100 can imitate motions of persons and behaviors of persons by moving the head portion 101 or the hand portions 107.

The sensor portion 115 is provided with a plurality of sensors detecting the physical quantity around or inside the device itself. As illustrated in FIG. 2, the sensor portion 115 contains the imaging portion 115a capturing an image of the surroundings and the sound sensor 115b detecting a sound. Moreover, although not illustrated, the sensor portion 115 contains a contact sensor detecting the contact to the device itself, a distance sensor measuring the distance to a surrounding object, an acceleration sensor detecting the motion of the device itself, a temperature sensor detecting the surrounding temperature, and the like.

The imaging portion 115a is a so-called camera and is disposed in the mouth portion 105. The imaging portion 115a is provided with an image acquisition portion condensing light emitted from a subject to acquire an image of the subject and an image processing portion processing the image acquired by the image acquisition portion. The sound sensor 115b is disposed in the head portion 101 and detects a voice uttered from a user, a surrounding environment sound, and the like. Although not illustrated, the robot 100 is provided with a plurality of microphones as the sound sensor 115b such that the head portion 101 is surrounded by the microphones, and can efficiently detect sounds generated in all the directions. The sensor portion 115 acquires information indicating the state around the robot 100 or the state inside the robot 100 by such a plurality of sensors and supplies the acquired information to the control portion 110.

The wireless communication portion 116 is provided with an interface for communicating with an external apparatus by wireless. The wireless communication portion 116 performs wireless communication with an external device, such as the charging station for charging the robot 100 and a cloud server, according to the communication standards of Wireless LAN (Local Area Network), e.g., Wi-Fi (Wireless Fidelity) or the like, Bluetooth (Registered Trademark), NFC (Near Field Communication), or the like under the control of the control portion 110.

The display portion 117 is a display device, such as a liquid crystal display, an organic EL (Electro Luminescence) display, or an LED (Light Emitting Diode), for example. The display portion 117 is disposed in an eyeball portion of the eye portion 104 and displays various images according to the situation under the control by a display driving circuit which is not illustrated.

The voice output portion 118 is provided with a speaker and a voice output interface and converts voice data generated by the control portion 110 into a voice, and then outputs the voice to the outside. The speaker is disposed in the head portion 101. The voice output portion 118 outputs various voices including cries of animals and human languages. For example, the robot 100 collects voices of a communication target by the sound sensor 115b, and then outputs a voice corresponding to the utterance contents of the communication target from the voice output portion 118. This enables simple conversation with the communication target.

Figure 3:
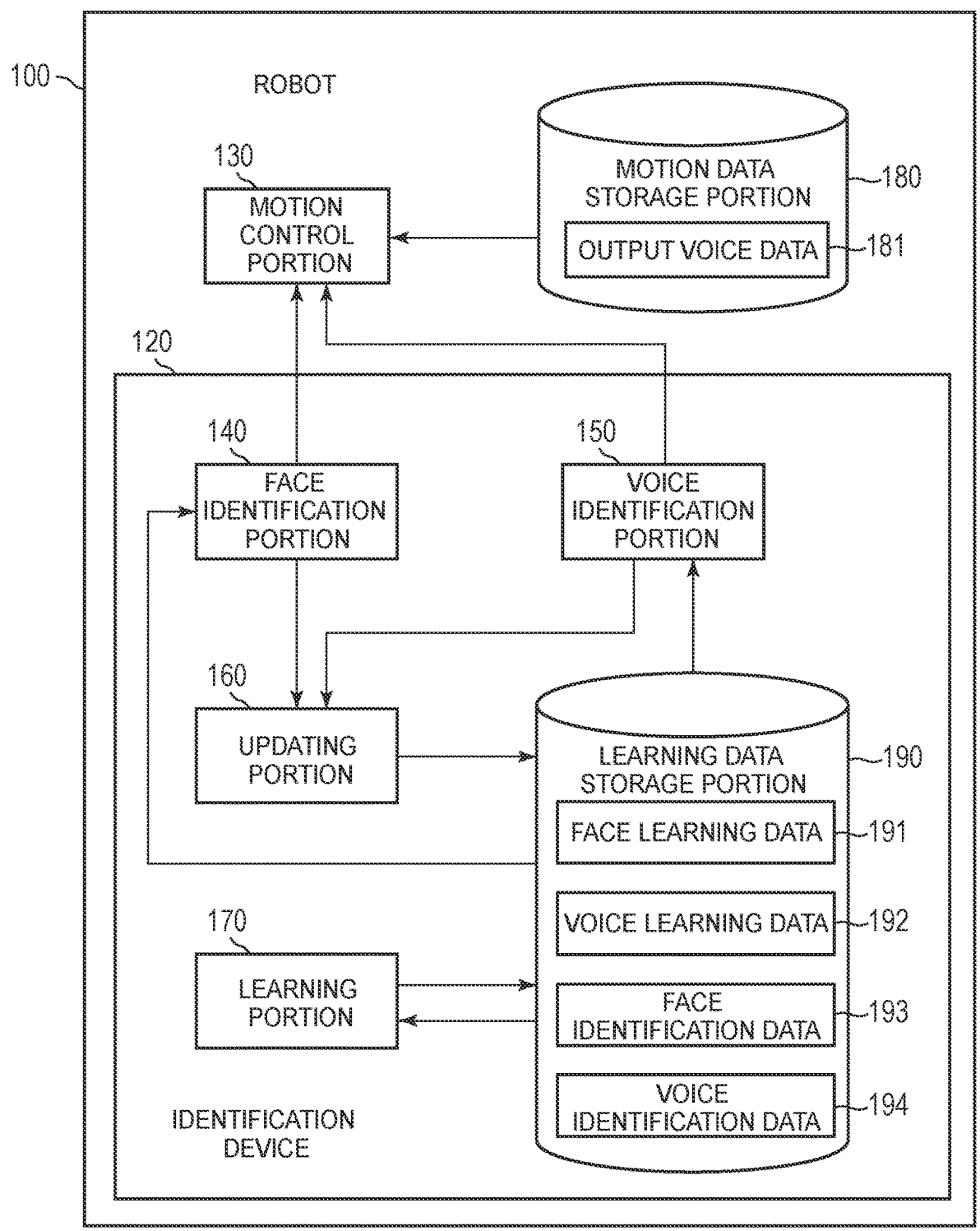
FIG. 3 is a block diagram illustrating the functional configurations of the robot according to Embodiment 1.

Next, the functional configurations of the robot 100 are described with reference to FIG. 3. As illustrated in FIG. 3, the robot 100 is functionally provided with a motion control portion 130, a face identification portion 140, a voice identification portion 150, an updating portion 160, and a learning portion 170. These portions function by reading programs stored in the ROM into the RAM, and then executing the read programs to control the portions by the CPU in the control portion 110.

Moreover, the robot 100 is provided with a motion data storage portion 180 and a learning data storage portion 190. The portions are built in an appropriate storage area of the storage portion 111. The face identification portion 140, the voice identification portion 150, the updating portion 160, the learning portion 170, and the learning data storage portion 190 are equivalent to the functions of an identification device 120 contained in the robot 100.

The motion control portion 130 controls at least one of the driving portion 113, the display portion 117, and the voice output portion 118 to cause the robot 100 to perform various motions specified beforehand. For example, the motion control portion 130 controls the driving portion 113 to thereby move the head portion 101, the ear portions 103, the hand portions 107, or the foot portions 108 provided as the movable portions 114. Thus, the motion control portion 130 changes the position, the direction, the posture, and the like of the robot 100. Furthermore, the motion control portion 130 interacts with a user by outputting a voice from the voice output portion 118. The motion control portion 130 is realized by the cooperation of the control portion 110 with the driving portion 113, the display portion 117, the voice output portion 118, and the like.

The motion data storage portion 180 stores motion data prescribing the motions of the robot 100 for each condition. The robot 100 performs various motions according to the situation around the robot 100 or the situation inside the robot 100 acquired by the sensor portion 115 containing the imaging portion 115a and the sound sensor 115b. The motion control portion 130 causes the robot 100 to perform various motions according to the situation referring to the motion data storage portion 180.

The motion data storage portion 180 stores output voice data 181 in which voice fixed form sentences output from the voice output portion 118 are prescribed as one of the motion data. The output voice data 181 are data prescribing typical voice texts uttered by the robot 100, such as "Please tell me your name." and "What were you doing yesterday?", for example.

The face identification portion 140 and the voice identification portion 150 individually acquire data different from each other indicating an individual (user), and then identify the individual based on the acquired data. Specifically, the face identification portion 140 acquires first data indicating the individual, and then identifies the individual based on the acquired first data. The first data is data indicating the feature of the individual and specifically face image data indicating the face of the individual. When the face of any one of persons present around the robot 100 enters the angle of view of the imaging portion 115a, the face identification portion 140 acquires a captured image including the face by the image capture of the imaging portion 115a. Thus, the face identification portion 140 acquires the face image data indicating the face of the individual as the first data.

When acquiring the face image data, the face identification portion 140 identifies the individual according to an identification method learned by the learning portion 170 described later. When specifically described, the face identification portion 140 identifies who the individual, whose face image data is acquired, is by comparing the face image indicated by the acquired face image data with face identification data 193 stored in the learning data storage portion 190.

The learning data storage portion 190 stores the face identification data 193 indicating a result learned by the learning portion 170 for each of a plurality of individuals. The face identification portion 140 calculates the matching degree between the acquired face image data and the face identification data 193 for each of the plurality of individuals whose face identification data 193 are stored in the learning data storage portion 190. The matching degree is an index indicating the degree in which the face image data and the face identification data 193 match (are similar) with each other.

When specifically described, the face identification portion 140 extracts, from the acquired face image data, the feature amount indicating the feature of the face formed of eyes, a nose, a mouth, ears, and the like contained in the face image data. Then, the face identification portion 140 calculates the matching degree indicating the degree in which the extracted feature amount is similar to the feature amount in each of the face identification data 193 of the plurality of individuals stored in the learning data storage portion 190.

As a result of calculating the matching degree for each of the plurality of individuals, when the highest value among the plurality of calculated matching degrees is higher than the predetermined threshold value, the face identification portion 140 specifies that the individual whose face image data is acquired is an individual having the highest matching degree among the plurality of individuals. On the other hand, when all the matching degrees calculated for each of the plurality of individuals are lower than the predetermined threshold value, the face identification portion 140 determines that the individual whose face image data is acquired is not stored in the learning data storage portion 190.

Thus, the face identification portion 140 searches for data matching with the acquired face image data from the face identification data 193 of the plurality of individuals stored in the learning data storage portion 190. The face identification portion 140 is realized by the cooperation of the control portion 110 with the imaging portion 115a. The face identification portion 140 functions as a face identification unit (a plurality of identification units).

The voice identification portion 150 acquires second data of a type different from the first data indicating an individual, and then identifies the individual based on the acquired second data. The second data is data indicating a feature different from the feature of the first data of the individual and specifically voice data indicating a voice of the individual. When a voice is uttered by any one of persons present around the robot 100, the voice identification portion 150 detects the voice by the sound sensor 115b. Thus, the voice identification portion 150 acquires voice data indicating the waveform of the voice of the individual as the second data.

When acquiring the voice data, the voice identification portion 150 identifies the individual according to an identification method learned by the learning portion 170 described later. When specifically described, the voice identification portion 150 compares a voice indicated by the acquired voice data with the voice identification data 194 stored in the learning data storage portion 190 to thereby identify who the individual, whose voice data is acquired, is.

The learning data storage portion 190 stores the voice identification data 194 indicating a result learned by the learning portion 170 for each of the plurality of individuals. The voice identification portion 150 calculates the matching degree between the acquired voice data and the voice identification data 194 for each of the plurality of individuals whose voice learning data 192 are stored in the learning data storage portion 190. The matching degree is an index indicating the degree in which the voice data and the voice identification data 194 match (are similar) with each other.

When specifically described, the voice identification portion 150 extracts the feature amount indicating the feature of a voice, such as a voice pressure and a pitch, from the acquired voice data. Then, the voice identification portion 150 calculates the matching degree indicating the degree in which the extracted feature amount is similar to the feature amount in each of the voice identification data 194 of the plurality of individuals stored in the learning data storage portion 190.

As a result of calculating the matching degree for each of the plurality of individuals, when the highest value among the calculated matching degrees is higher than the predetermined threshold value, the voice identification portion 150 specifies that the individual whose voice data is acquired is an individual having the highest matching degree among the plurality of individuals. On the other hand, when all the matching degrees calculated for each of the plurality of individuals are lower than the predetermined threshold value, the voice identification portion 150 determines that the individual whose voice data is acquired is not stored in the learning data storage portion 190.

Thus, the voice identification portion 150 searches for data matching with the acquired voice data from the voice identification data 194 of the plurality of individuals stored in the learning data storage portion 190. The voice identification portion 150 is realized by the cooperation of the control portion 110 with the sound sensor 115b. The voice identification portion 150 functions as a voice identification unit (a plurality of identification units).

When an individual is identified by the face identification portion 140 or the voice identification portion 150, the motion control portion 130 causes the robot 100 to perform a motion according to the identified individual. The motion according to the identified individual is a motion for communicating with the individual with the contents according to the identified individual, such as calling the name of the individual or outputting a voice according to the schedule registered beforehand of the individual, for example. When the individual is identified by at least one of the face identification portion 140 and the voice identification portion 150, the motion control portion 130 causes the robot 100 to perform a motion for communicating with the identified individual by moving the movable portions 114, causing the display portion 117 to display an image, or outputting a voice from the voice output portion 118.

Thus, the robot 100 identifies an individual using two different features of a face and a voice, and therefore can identify an individual when only one of the face and the voice can be detected. In other words, even in the case where an individual has not been able to be identified by either the face or the voice, when the individual can be identified by the other one, the robot 100 can move according to the identified individual. Therefore, the robot 100 can identify an individual also in various situations where a face can be detected but a voice cannot be detected, a voice can be detected but a face cannot be detected, and the like, and can communicate with the identified individual.

The learning data storage portion 190 stores face learning data 191 and the voice learning data 192 which are plural learning data indicating the features different from each other of an individual. The face learning data 191 is first learning data indicating the feature of a face which is a first feature of an individual and learning data for learning an individual identification method in the face identification portion 140 by the learning portion 170. The voice learning data 192 is second learning data indicating the feature of a voice which is a second feature different from the first feature of an individual and learning data for learning an individual identification method in the voice identification portion 150 by the learning portion 170. Moreover, the learning data storage portion 190 stores the face identification data 193 and the voice identification data 194 which are plural identification data individually corresponding to the plural learning data. The face identification data 193 is first identification data for identifying an individual by the face identification portion 140 and learned data indicating the individual identification method learned by the learning portion 170 based on the face learning data 191. The voice identification data 194 is second identification data for identifying an individual by the voice identification portion 150 and learned data indicating the individual identification method learned by the learning portion 170 based on the voice learning data 192.

FIG. 4 illustrates examples of the data stored in the learning data storage portion 190. As illustrated in FIG. 4, the learning data storage portion 190 stores the face learning data 191, the voice learning data 192, the face identification data 193, and the voice identification data 194 for each of the plurality of individuals. The plurality of individuals is equivalent to a plurality of users whose face and voice were detected around the robot 100 in the past. In the learning data storage portion 190, the face learning data 191, the voice learning data 192, the face identification data 193, and the voice identification data 194 are stored to be associated with an ID (identifier) for distinguishing each of the plurality of individuals and the names of the corresponding individuals. The updating portion 160 updates the face learning data 191 stored in the learning data storage portion 190 based on the face image data acquired by the face identification portion 140. Moreover, the updating portion 160 updates the voice learning data 192 stored in the learning data storage portion 190 based on the voice data acquired by the voice identification portion 150. The updating portion 160 is realized by the cooperation of the control portion 110 with the storage portion 111.

When specifically described, the updating portion 160 analyzes the luminance distribution, the luminance gradient, and the like in the face image data acquired by the face identification portion 140. Then the updating portion 160 extracts the feature amount of the face formed of eyes, a nose, a mouth, ears, and the like included in the face image data from the face image data as parameters quantifying the features effective for the face identification. The face identification portion 140 generates the face learning data 191 indicating the extracted feature amount and causes the learning data storage portion 190 to store the generated face learning data 191 associated with the IDs of the individuals.

Moreover, the updating portion 160 analyzes the voice data acquired by the voice identification portion 150. Then, the updating portion 160 extracts the feature amount, such as a voice pressure and a pitch, as parameters quantifying the features effective for the voice identification. Alternatively, the updating portion 160 may calculate the Mel-Frequency Cepstrum Coefficients (MFCC) which are feature parameters obtained by converting a voice signal on the frequency axis as the feature amount of a voice. The voice identification portion 150 generates the voice learning data 192 indicating the extracted feature amount, and then causes the learning data storage portion 190 to store the generated voice learning data 192 associated with the IDs of the individuals.

The accuracy as data for learning of the face learning data 191 increases when updated using plural face image data different from each other indicating the face of the same individual. Therefore, the face learning data 191 is generated and updated using plural face image data acquired at different timings for each individual. Similarly, the accuracy as data for learning of the voice learning data 192 increases when updated using plural voice data indicating the voice of the same individual. Therefore, the voice learning data 192 is generated and updated using plural voice data acquired at different timings for each individual.

When described in more detail, when an individual is not identified by one or more identification portions of the plurality of identification portions and the individual is identified by one or more other identification portions of the plurality of identification portions, the updating portion 160 updates the learning data corresponding to any identification portion by which the individual is not identified among the plural learning data stored in the learning data storage portion 190. Specifically, when an individual is not identified by one identification portion of the face identification portion 140 and the voice identification portion 150 and the individual is identified by the other identification portion of the face identification portion 140 and the voice identification portion 150, the updating portion 160 updates the learning data corresponding to the one identification portion of the face learning data 191 and the voice learning data 192 stored in the learning data storage portion 190.

Herein, the case where the individual is identified is a case where the identification of the individual whose face image data or voice data is acquired with relatively high accuracy succeeds. Specifically, the case is equivalent to a case where data having a matching degree with the acquired face image data or voice data higher than the predetermined threshold value is present among the face identification data 193 or the voice identification data 194 of the plurality of individuals stored in the learning data storage portion 190. On the other hand, the case where the individual is not identified is a case where the identification of the individual whose face or voice is acquired with relatively high accuracy fails. Specifically, the case is equivalent to a case where data having a matching degree with the acquired face image data or voice data higher than the predetermined threshold value is not present among the face identification data 193 or the voice identification data 194 of the plurality of individuals stored in the learning data storage portion 190.

The case where the individual is not identified by one identification portion of the face identification portion 140 and the voice identification portion 150 and the individual is identified by the other identification portion is specifically a case where, while the identification of an individual by the face identification portion 140 succeeds, the identification of the individual by the voice identification portion 150 fails and a case where, while the identification of an individual by the voice identification portion 150 succeeds, the identification of the individual by the face identification portion 140 fails. The former case is equivalent to a case where the voice of a user has changed from the previous voice due to a factor, such as aging or cold, for example. The latter case is equivalent to a case where the face of a user has changed from the previous face due to a factor, such as aging, a change in the hairstyle, makeup, or the wearing of a mask, for example. In particular, when a user is a child, the face and the voice are likely to change with progress of time, and therefore a situation where the user is not identified by one identification portion is likely to arise.

When the individual is not identified by the one identification portion and the individual is identified by the other identification portion, the updating portion 160 updates one learning data corresponding to the one identification portion by which the individual has not been able to be identified among the face learning data 191 and the voice learning data 192 stored for each of the plurality of individuals in the learning data storage portion 190. When specifically described, the updating portion 160 extracts the feature amount based on one data corresponding to the one identification portion by which the individual has not been able to be identified among face image data and voice data which are plural newly acquired data in order to cope with the fact that the face or the voice of the individual has been changed. The one data is the data used for the identification of the individual when the individual is not identified by the one identification portion. In other words, the one data is data which is acquired by the one identification portion and used for the identification of the individual but for which data having a matching degree higher than the threshold value is not present among the face identification data 193 or the voice identification data 194 stored in the learning data storage portion 190. When extracting the feature amount from the one data, the updating portion 160 adds the extracted feature amount to the learning data already stored in the learning data storage portion 190. Thus, the learning data stored in the learning data storage portion 190 is updated to new learning data in which the newly extracted feature amount is added to the previously extracted feature amount.

For example, in a case where the face image data and the voice data of an individual having an ID "001" are acquired, when the individual is not identified by the face identification portion 140 and the individual is identified by the voice identification portion 150, the updating portion 160 updates face learning data "Data A01" of the individual having the ID "001" stored in the learning data storage portion 190 to new face learning data "Data A11" as illustrated in FIG. 5. On the other hand, the updating portion 160 does not update voice learning data "Data A02" of the individual having the ID "001" because the identification of the individual also by the present data succeeds.

At this time, the updating portion 160 updates one learning data associated with the individual identified by the other identification portion of the face learning data 191 and the voice learning data 192 stored for each of the plurality of individuals in the learning data storage portion 190. In other words, the updating portion 160 uses an identification result by the other identification portion by which the identification of the individual succeeds in order to specify the individual whose data is to be updated among the learning data of the plurality of individuals stored in the learning data storage portion 190.

Specifically in the examples of FIG. 5, when the individual is not identified by the face identification portion 140 and the individual is identified by the voice identification portion 150, the updating portion 160 specifies which individual's face learning data 191 is to be updated among the face learning data 191 of the plurality of individuals stored in the learning data storage portion 190 using an identification result by the voice identification portion 150. For example, when the individual having the ID "001" is identified by the voice identification portion 150, the updating portion 160 specifies that the face learning data 191 associated with the individual having the ID "001" is to be updated. Thus, the robot 100 has the two identification portions, and therefore, even when an individual cannot be identified by one identification portion, the learning data to be updated can be easily specified by the use of an identification result by the other identification portion.

Thus, when the feature of the face or the voice of the individual has changed as compared with the previous feature of the face or the voice, the updating portion 160 updates the face learning data 191 or the voice learning data 192 stored in the learning data storage portion 190 with the new feature. Thus, the face learning data 191 and the voice learning data 192 are updated so as to reflect the newest features of the face and the voice of the individual, and therefore the quality as data for learning is strengthened.

On the other hand, when an individual is identified by both the face identification portion 140 and the voice identification portion 150, i.e., when an individual is identified by all the plurality of identification portions, the features of the face and the voice of the individual do not greatly change, and therefore there is less need to update the face learning data 191 and the voice learning data 192. Therefore, in this case, the updating portion 160 does not update the face learning data 191 and the voice learning data 192 stored in the learning data storage portion 190. Thus, the processing in the robot 100 can be simplified, and in particular, a reduction in identification accuracy due to overlearning can be avoided.

When an individual is not identified by both the face identification portion 140 and the voice identification portion 150, i.e., when an individual is not identified by any of the plurality of identification portions, a possibility that both the face identification data 193 and the voice identification data 194 of the individual are not stored in the learning data storage portion 190 is high as with the case where the robot 100 detects the face and the voice of a new user, for example. Therefore, in this case, the updating portion 160 causes the learning data storage portion 190 to store the face learning data 191 and the voice learning data 192 associated with the ID of a new individual which is not stored in the learning data storage portion 190. In other words, the updating portion 160 newly registers the face learning data 191 and the voice learning data 192 of the individual in the learning data storage portion 190.

When a plurality of users is present around the robot 100, there is a possibility that a face image captured by the imaging portion 115a and a voice detected by the sound sensor 115b do not belong to the same user. Even in such a case, in order to identify the same user by the face identification portion 140 and the voice identification portion 150, the face identification portion 140 analyzes the motion of lips in each of a plurality of face images when the plurality of face images is included in face image data acquired by the imaging portion 115a. When the plurality of face images is included in the face image data acquired by the imaging portion 115a, the face identification portion 140 determines that a face image in which lips are moving when voice data is acquired by the voice identification portion 150 among the plurality of face images is a face image of a user whose voice data is acquired, and then identifies the user based on the face image.

Alternatively, the face identification portion 140 may read the speaking contents of a user from the motion of lips, and then, when the read contents and the contents of a voice acquired by the voice identification portion 150 are coincident with each other, the face identification portion 140 may determine that the face image is a face image of the user whose voice data is acquired. At this time, when voices are simultaneously uttered by the plurality of users, the voice identification portion 150 may analyze the contents of the voice uttered by each of the plurality of users by performing sound source separation of the voice detected by the sound sensor 115b.

Returning to FIG. 3, the learning portion 170 learns an individual identification method in the face identification portion 140 based on the face learning data 191 stored in the learning data storage portion 190. Moreover, the learning portion 170 learns an individual identification method in the voice identification portion 150 based on the voice learning data 192 stored in the learning data storage portion 190. The learning portion 170 is realized by the cooperation of the control portion 110 with the storage portion 111. The learning portion 170 functions as a learning unit.

When specifically described, the learning portion 170 learns the feature of the face of an individual using the face learning data 191 stored in the learning data storage portion 190 as teacher data. As an example, the learning portion 170 can use a neural network technique. In this case, the neural network contains an input layer in which the feature amount of the face image of an individual is input, an output layer outputting an identification result indicating an individual to whom the face in the face image belongs, and one or more intermediate layers. The learning portion 170 inputs the feature amount of the face images of an individual at a plurality of timings indicated by the face learning data 191 in the input layer, and then determines whether the identification result output in the output layer is correct or incorrect. Then, the learning portion 170 adjusts parameters in the intermediate layers using a backpropagation method or the like so that the correct answer rate of the identification results output in the output layer becomes as high as possible. When a network (learning model) where the parameters of the intermediate layers are optimized by such processing is obtained, the learning portion 170 causes the learning data storage portion 190 to store data indicating the obtained network associated with the ID of the individual as the face identification data 193 for identifying the face of the individual.

Moreover, the learning portion 170 learns the feature of a voice of an individual using the voice learning data 192 stored in the learning data storage portion 190 as teacher data. Also in the voice learning, the learning portion 170 can use the neural network technique as with the face learning. The learning portion 170 causes the learning data storage portion 190 to store the voice identification data 194 obtained by the learning associated with the ID of the individual.

For example, as illustrated in FIG. 5, when the face learning data "Data A01" of the individual having the ID "001" is updated to new face learning data "Data A11" by the updating portion 160, the learning portion 170 updates face identification data "Data A03 of the individual to new face identification data "Data A13" learned based on the new face learning data "Data A11". Similarly, although not illustrated, when the voice learning data 192 is updated by the updating portion 160, the learning portion 170 updates the corresponding voice identification data 194 of the individual.

In order to learn the features of the face and the voice, the learning portion 170 may use any kind of learning algorithm without being limited to the neural network. For example, the learning portion 170 can use well-known learning techniques, such as a support vector machine. The generated face identification data 193 is used in order for the face identification portion 140 to calculate the matching degree by comparison with the face image data. Moreover, the generated voice identification data 194 is used in order for the voice identification portion 150 to calculate the matching degree by comparison with the voice data.

When described in more detail, the learning portion 170 learns, when the updating portion 160 updates either the face learning data 191 or the voice learning data 192 of the plurality of individuals stored in the learning data storage portion 190, an identification method based on the updated learning data. As described above, when the individual is not identified by the one identification portion and the individual is identified by the other identification portion, the updating portion 160 updates the face learning data 191 or the voice learning data 192 based on one data acquired by the one identification portion among the face image data and the voice data. Thus, when the learning data is updated by the updating portion 160, the learning portion 170 learns an individual identification method in the corresponding one identification portion. In other words, the learning portion 170 learns an individual identification method in the one identification portion by which the individual is not identified using one data acquired by the one identification portion among the face image data and the voice data. Thus, the learning portion 170 strengthens the face identification data 193 or the voice identification data 194 stored in the learning data storage portion 190 to data in which the newest feature of the individual is reflected.

After the identification method is learned by the learning portion 170, the face identification portion 140 and the voice identification portion 150 identify an individual by the identification method after learning. By the use of the identification method in which the newest feature of the individual is reflected, the face identification portion 140 and the voice identification portion 150 can identify an individual with high accuracy.

The flow of processing carried out in the robot 100 configured as described above is described with reference to the flow chart illustrated in FIG. 6.

Figure 6:
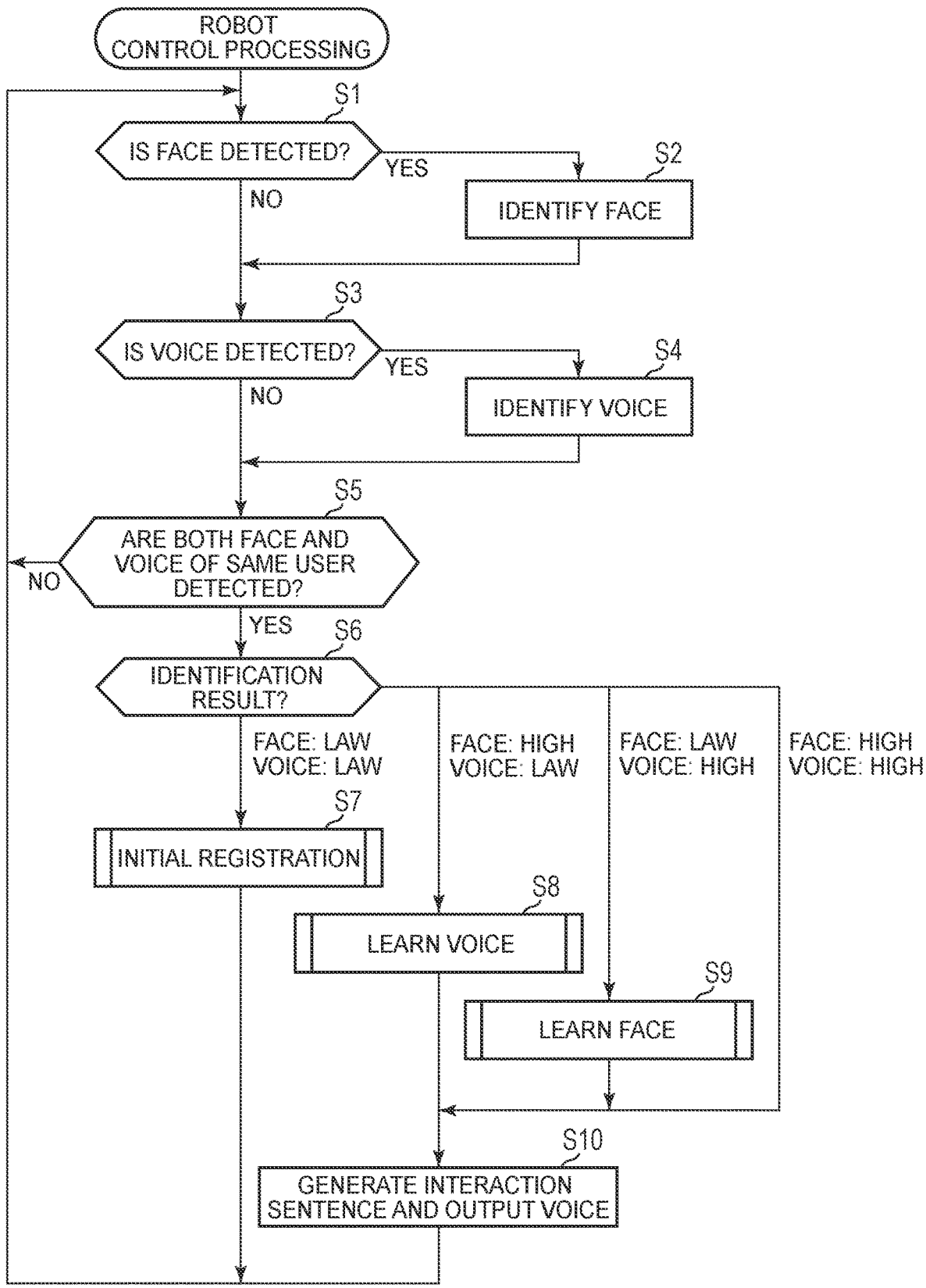
FIG. 6 is a flow chart illustrating the flow of robot control processing carried out by the robot according to Embodiment 1.

The robot control processing illustrated in FIG. 6 is started when the power source of the robot 100 is turned on and the battery 112 is charged, whereby the robot 100 is brought into a state where the robot 100 can normally move.

When the robot control processing is started, the control portion 110 determines whether the face of a person is detected (Step S1). When specifically described, the control portion 110 captures an image of the surroundings of the robot 100 by the imaging portion 115a. Then, the control portion 110 determines whether the face of a person is included in the image captured by the imaging portion 115a using a well-known face detection technique.

When the face is detected (Step S1; YES), the control portion 110 functions as the face identification portion 140 to carry out face identification processing to the detected face (Step S2). When specifically described, the control portion 110 calculates the matching degree with the detected face image for each of the face identification data 193 of the plurality of individuals with reference to the face identification data 193 of the plurality of individuals stored in the learning data storage portion 190. Then, the control portion 110 searches for data matched with the detected face image from the face identification data 193 of the plurality of individuals stored in the learning data storage portion 190.

On the other hand, when no face is detected (Step S1; NO), the control portion 110 skips the face identification processing in Step S2.

Secondly, the control portion 110 determines whether a voice is detected (Step S3). When specifically described, the control portion 110 detects sounds generated around the robot 100 by the sound sensor 115b. Then, the control portion 110 determines whether a voice of a person is included in the sounds detected by the sound sensor 115b using a well-known voice detection technique.

When a voice is detected (Step S3; YES), the control portion 110 functions as the voice identification portion 150 to carry out voice identification processing to the detected voice (Step S4). When specifically described, the control portion 110 calculates the matching degree with the detected voice for each of the voice identification data 194 of the plurality of individuals with reference to the voice identification data 194 stored for each of the plurality of individuals in the learning data storage portion 190. Then, the control portion 110 searches for data matched with the detected voice from the voice identification data 194 of the plurality of individuals stored in the learning data storage portion 190.

On the other hand, when no voice is detected (Step S3; NO), the control portion 110 skips the voice identification processing in Step S4.

Next, the control portion 110 determines whether both the face and the voice of the same user are detected in the face detection in Step S1 and the voice detection in Step S3 (Step S5). When specifically described, in the case where only one user is present around the robot 100, when the face is detected in Step S1 and the voice is detected in Step S3, the control portion 110 determines that both the face and the voice of the same user are detected. On the other hand, in the case where a plurality of users is present around the robot 100, the control portion 110 determines whether the timing when lips in a face image captured by the imaging portion 115a are moving and the timing when the voice is detected by the sound sensor 115b are coincident with each other in a predetermined error range to thereby determine whether both the face and the voice of the same user are detected.

When it is determined that at least one of the face and the voice of the same user is not detected (Step S5; NO), the control portion 110 skips the processing in and after Step S6 and returns the processing to Step S1. On the other hand, when it is determined that both the face and the voice of the same user are detected (Step S5; YES), the control portion 110 determines the results of the face identification processing in Step S2 and the voice identification processing in Step S4 (Step S6). When specifically described, the control portion 110 determines whether an individual whose matching degree in the face identification is higher than the predetermined threshold value and whose matching degree in the voice identification is higher than the predetermined threshold value is present among the plurality of individuals whose face identification data 193 and voice identification data 194 are stored in the learning data storage portion 190.

When both the matching degree in the face identification and the matching degree in the voice identification are low as the result of the determination (Step S6; Face: low, Voice: low), the control portion 110 carries out initial registration processing (Step S7). This case is a case where a user whose matching degree is higher than the threshold values in both the face identification and the voice identification is not stored in the learning data storage portion 190 and is equivalent to a case where the robot 100 detects the face and the voice of a new user, for example. The details of the initial registration processing in Step S7 are described with reference to the flow chart illustrated in FIG. 7.

Figure 7:
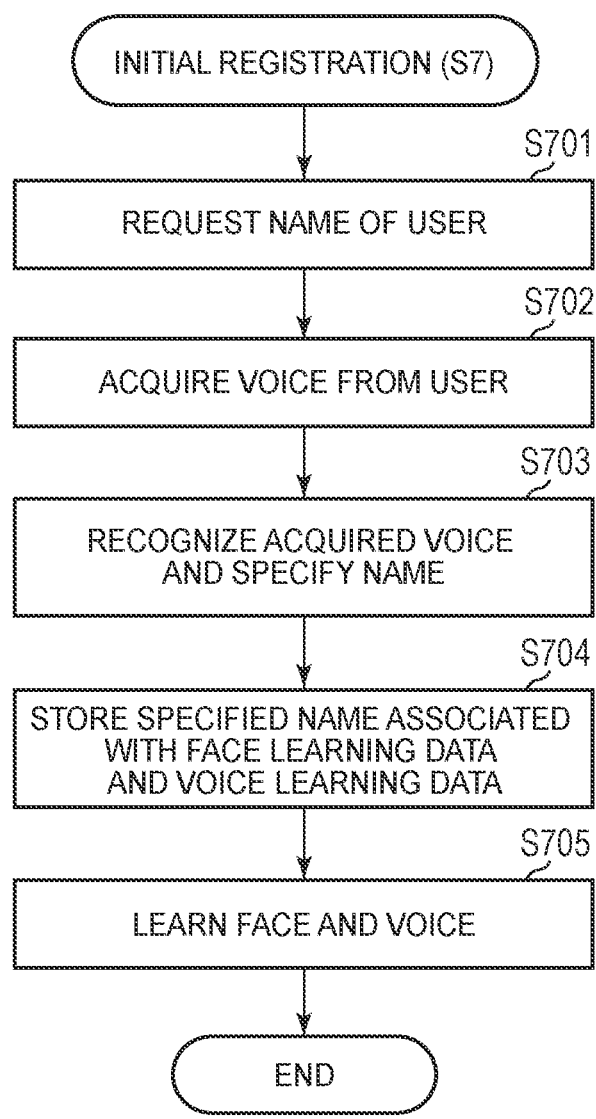
FIG. 7 is a flow chart illustrating the flow of initial registration processing carried out by the robot according to Embodiment 1.

When the initial registration processing illustrated in FIG. 7 is started, the control portion 110 requests the name of a user (Step S701). For example, the control portion 110 outputs a voice of the contents, such as "Please tell me your name.", stored beforehand as the output voice data 181 in the motion data storage portion 180 through the voice output portion 118. Thus, the control portion 110 requests a user to utter a user's own name.

When the name of the user is requested, the control portion 110 acquires a voice uttered from the user in response to the request in Step S701 by the sound sensor 115b (Step S702). When the voice is acquired, the control portion 110 recognizes the acquired voice to specify the name of the user (Step S703). For example, when a voice "I am XXX." is uttered from the user, the control portion 110 carries out voice recognition to the acquired voice, and then converts the acquired voice into a text. Then, the control portion 110 cuts out the portion of "XXX" corresponding to the name from the voice converted into the text. Thus, the control portion 110 specifies the name of the user.

When the name of the user is specified, the control portion 110 functions as the updating portion 160 to store the specified name associated with the face learning data 191 and the voice learning data 192 of the user in the learning data storage portion 190 (Step S704). When specifically described, the control portion 110 generates the face learning data 191 indicating the feature of the face of the user based on the face image data detected in Step S1, and then generates the voice learning data 192 indicating the feature of the voice of the user based on the voice data detected in Step S3. Then, the control portion 110 gives an ID distinguishable from other users, and then stores the generated face learning data 191 and voice learning data 192 in the learning data storage portion 190. Thus, the learning data of the new user is newly registered in the learning data storage portion 190.

When the face learning data 191 and the voice learning data 192 are stored, the control portion 110 functions as the learning portion 170 to learn the face and the voice of the user based on the stored face learning data 191 and voice learning data 192 (Step S705). When specifically described, the control portion 110 learns the features of the face and the voice using the face learning data 191 and the voice learning data 192 newly stored in the learning data storage portion 190 as teacher data. Then, the control portion 110 causes the leaning data storage portion 190 to store the face identification data 193 and the voice identification data 194 indicating the learned results associated with the ID of the corresponding user. Thus, the initial registration processing illustrated in FIG. 7 is completed.

The control portion 110 may confirm whether the specified name is correct or incorrect with the user before storing the specified name in the learning data storage portion 190. For example, when specifying the name of the user in Step S703, the control portion 110 outputs a voice, such as "Are you Mr./Ms. XX?", from the voice output portion 118 by combining a fixed form sentence for confirming the name prepared beforehand with the specified name. Then, when a voice indicating consent to such a confirmation can be acquired from the user by the sound sensor 115b, the specified name may be stored in the learning data storage portion 190 associated with face image data and voice data of the user.

Returning to FIG. 6, in Step S6, when the matching degree in the face identification is high and the matching degree in the voice identification is low (Step S6; Face: high, Voice: low), the control portion 110 learns a voice (Step S8). This case is a case where a user whose matching degree in the face identification is higher than the threshold value is stored in the learning data storage portion 190 and a user whose matching degree in the voice identification is higher than the threshold value is not stored in the learning data storage portion 190, and specifically equivalent to a case where the voice of the user has changed from the previous voice. The details of the voice learning processing in Step S8 are described with reference to the flow chart illustrated in FIG. 8.

Figure 8:
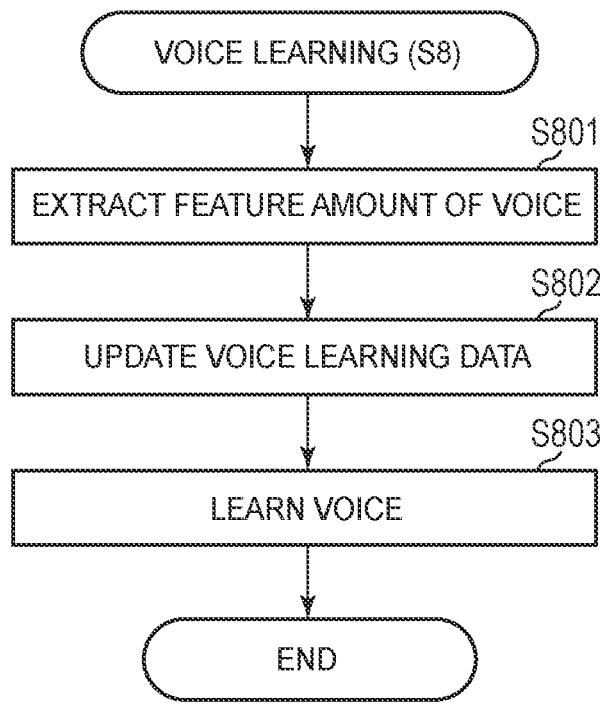
FIG. 8 is a flow chart illustrating the flow of voice learning processing carried out by the robot according to Embodiment 1.

When the voice learning processing illustrated in FIG. 8 is started, the control portion 110 extracts the feature amount of the voice of the user (Step S801). When specifically described, the control portion 110 analyzes the voice detected in Step S3 to thereby extract the feature amount of the voice, such as a voice pressure and a pitch.

When the feature amount of the voice is extracted, the control portion 110 functions as the updating portion 160 to update the voice learning data 192 stored in the learning data storage portion 190 (Step S802). When specifically described, the control portion 110 updates the voice learning data 192 associated with the ID of the individual identified by the face identification in Step S2 by the extracted feature amount. Thus, the control portion 110 strengthens the voice learning data 192 stored in the learning data storage portion 190 to data reflecting the newest feature of the voice of the user.

When the voice learning data 192 is updated, the control portion 110 functions as the learning portion 170 to learn the voice of the user based on the voice learning data 192 after updated (Step S803). When specifically described, the control portion 110 relearns the feature of the voice using the voice learning data 192 in which the newest feature of the voice of the user is reflected as teacher data, and then causes the learning data storage portion 190 to store the voice identification data 194 indicating the relearned result associated with the ID of the corresponding user. Thus, the voice learning processing illustrated in FIG. 8 is completed.

Returning to FIG. 6, in Step S6, when the matching degree in the face identification is low and the matching degree in the voice identification is high (Step S6; face: low, Voice: high), the control portion 110 learns the face of the user (Step S9). This case is a case where a user whose matching degree in the face identification is higher than the threshold value is not stored in the learning data storage portion 190 and a user whose matching degree in the voice identification is higher than the threshold value is stored in the learning data storage portion 190, and specifically equivalent to a case where the face of the user has changed from the previous face. The details of the face learning processing in Step S9 are described with reference to the flow chart illustrated in FIG. 9.

Figure 9:
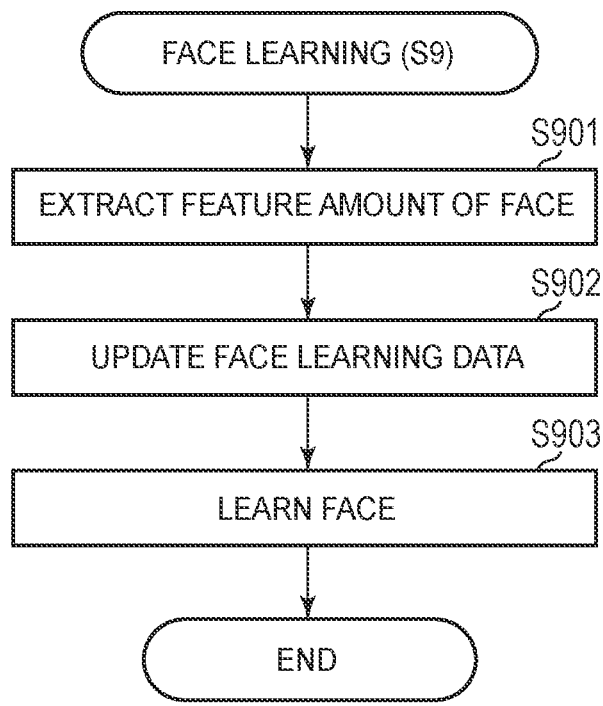
FIG. 9 is a flow chart illustrating the flow of face learning processing carried out by the robot according to Embodiment 1.

When the face learning processing illustrated in FIG. 9 is started, the control portion 110 extracts the feature amount of the face of the user (Step S901). When specifically described, the control portion 110 analyzes the luminance distribution in the face image detected in Step S1 to thereby extract the feature amount of the face formed of eyes, a nose, a mouth, ears, and the like.

When the feature amount of the face is extracted, the control portion 110 functions as the updating portion 160 to update the face learning data 191 stored in the learning data storage portion 190 (Step S902). When specifically described, the control portion 110 updates the face learning data 191 associated with the ID of the individual identified by the voice identification in Step S4 by the extracted feature amount. Thus, the control portion 110 strengthens the face learning data 191 stored in the learning data storage portion 190 to data reflecting the newest feature of the face of the user.

When the face learning data 191 is updated, the control portion 110 functions as the learning portion 170 to learn the face of the user based on the face learning data 191 after updated (Step S903). When specifically described, the control portion 110 relearns the feature of the face using the face learning data 191 in which the newest feature of the face of the user is reflected as teacher data, and then causes the learning data storage portion 190 to store the face identification data 193 indicating the relearned result associated with the ID of the corresponding user. Thus, the face learning processing illustrated in FIG. 9 is completed.

Returning to FIG. 6, in Step S6, when both the matching degree in the face identification and the matching degree in the voice identification are high (Step S6; Face: high, Voice: high), the control portion 110 does not carry out any processing of the initial registration processing, the voice learning processing, and the face learning processing. This case is equivalent to a case where a user whose matching degree is higher than the threshold value in both the face identification and the voice identification is stored in the learning data storage portion 190.

In Step S6, when at least one of the matching degree in the face identification and the matching degree in the voice identification is high, i.e., when the user is identified by at least one of the face identification and the voice identification, the control portion 110 functions as the motion control portion 130 to generate an interaction sentence with the identified user and output a voice (Step S10). When specifically described, the control portion 110 generates the interaction sentence for communicating with the identified user by combining the texts stored in the output voice data 181, synthesizes a voice corresponding to the generated interaction sentence, and then outputs the voice from the voice output portion 118. Thus, the control portion 110 communicates with the identified user.

Thereafter, the control portion 110 returns the processing to Step S1, and then repeats the processing from Step S1 to Step S10. Thus, the control portion 110 acquires the face image data and the voice data of the user while communicating with the user around the robot 100, and then updates the face learning data 191 and the voice learning data 192 stored in the learning data storage portion 190.

As described above, the robot 100 and the identification device 120 according to Embodiment 1 are provided with the face identification portion 140 and the voice identification portion 150. When the identification of the individual by the one identification portion fails and the identification of the individual by the other identification portion succeeds, the learning data corresponding to the one identification portion is updated and an individual identification method in the one identification portion is learned based on the updated learning data. Thus, when the individual is identified by the other identification portion and the individual is not identified by one identification portion, the feature of the individual is relearned. Therefore, the robot 100 and the identification device 120 can appropriately identify the individual even when the feature of the individual has changed with progress of time due to the growth, aging, or other factors.

Moreover, the robot 100 according to Embodiment 1 is provided with the two different types of identification portions. Therefore, even in the situation where the identification of a user by one identification portion fails, when the identification of the user by the other identification portion succeeds, learning data for learning an identification method of the one identification portion can be collected while communicating with the user. Therefore, the robot 100 can collect plural learning data for improving the identification accuracy in a natural behavior of the robot 100 without a user's consciousness.

Moreover, the robot 100 and the identification device 120 according to Embodiment 1 learn the individual identification method in the one identification portion by which the identification of the individual fails using the face image data or the voice data acquired by the one identification portion. Thus, the accuracy of the identification by the identification portion by which the identification of the individual fails of the two identification portions can be accurately improved. In particular, the robot 100 and the identification device 120 according to Embodiment 1 learn the individual identification method in the one identification portion by which the identification of the individual fails using data used for the identification of the individual when the identification by the one identification portion fails. Therefore, the accuracy of the identification can be improved effectively utilizing data acquired from the individual.

Moreover, in Embodiment 1, the face learning data 191 and the voice learning data 192 are stored associated with each of the plurality of individuals in the learning data storage portion 190. When the identification of the individual by the one identification portion fails and the identification of the individual by the other identification portion succeeds, the updating portion 160 updates one learning data associated with the individual identified by the other identification portion of the face learning data 191 and the voice learning data 192 stored for each of the plurality of individuals in the learning data storage portion 190. Thus, even in the case where the identification of the individual by the one identification portion fails, the identification of the individual by the other identification portion succeeds, and therefore the updating portion 160 can accurately specify which individual's learning data 191 of the plurality of individuals is to be updated.

Embodiment 2

Next, Embodiment 2 of the present invention is described.

In Embodiment 1 above, the updating portion 160 updates the face learning data 191 stored in the learning data storage portion 190 based on the face image data used for the face identification by the face identification portion 140. The updating portion 160 updates the voice learning data 192 stored in the learning data storage portion 190 based on the voice data used for the voice identification by the voice identification portion 150. However, only the face image data used for the face identification or the voice data used for the voice identification are not enough as data for updating the learning data in some cases. Thus, in Embodiment 2, the motion control portion 130 causes the robot 100 to perform a motion for easily acquiring data to be updated by the updating portion 160 in order to acquire data suitable for updating the learning data.

When specifically described, in a case where the identification of an individual by one identification portion of the face identification portion 140 and the voice identification portion 150 fails and the identification of the individual by the other identification portion succeeds, the motion control portion 130 causes the robot 100 to perform a motion for interacting with the individual identified by the other identification portion. For example, the motion control portion 130 outputs a voice for interacting with the identified individual, such as "What were you doing yesterday?" and "What is your plan for today?", from the voice output portion 118. Alternatively, the motion control portion 130 may interact with the individual by moving the movable portions 114 or causing the display portion 117 to display an image to attract attention of the individual.

When the identification of the individual by the one identification portion fails and the identification of the individual by the other identification portion succeeds, the updating portion 160 updates the face learning data 191 or the voice learning data 192 stored in the learning data storage portion 190 based on a response of the individual to the motion performed by the robot 100. When specifically described, the identified individual responds to the motion performed by the robot 100 in such a manner as to utter a voice or turn the face toward the robot 100 in order to interact with the robot 100, for example. The updating portion 160 acquires face image data or voice data of the individual through the imaging portion 115a or the sound sensor 115b in such an interaction with the individual. Then, the updating portion 160 extracts the feature from the acquired face image data or voice data to update the face learning data 191 or the voice learning data 192 stored in the learning data storage portion 190 by the extracted feature.

FIG. 10 illustrates the flow of voice learning processing carried out by the robot 100 according to Embodiment 2. In Step S8 of the processing illustrated in FIG. 6, the robot 100 according to Embodiment 2 carries out voice learning processing illustrated in FIG. 10 in place of the voice learning processing illustrated in FIG. 8 in Embodiment 1.

When the voice learning processing illustrated in FIG. 10 is started, the control portion 110 functions as the motion control portion 130 to generate an interaction sentence to a user, and then output the corresponding voice (Step S811). When specifically described, the control portion 110 acquires a text of arbitrary contents, such as light conversation, from the output voice data 181 stored in the motion data storage portion 180. Then, the control portion 110 converts the acquired text into a voice by voice synthesis, and then outputs the synthesized voice from the voice output portion 118.

When the voice is output, the control portion 110 acquires a voice uttered by a user in response to the output voice by the sound sensor 115b (Step S812). Then, the control portion 110 recognizes the acquired voice, generates a response sentence responding to the contents of the recognized voice, and then outputs the corresponding voice (Step S813). When specifically described, the control portion 110 acquires a text of contents which are not unnatural as the response to the voice acquired from the user from the output voice data 181. Then, the control portion 110 converts the acquired text into a voice by voice synthesis, and then outputs the synthesized voice from the voice output portion 118. Thus, the control portion 110 interacts with the user whose face is identified. The control portion 110 repeats the processing of Step S812 and Step S813 as appropriate. Thus, the control portion 110 collects voices of the user suitable for learning the voice while interacting with the user.

When the voice of the user is acquired while repeating the processing of Step S812 and Step S813, the control portion 110 functions as the updating portion 160 to extract the feature amount of the voice of the user (Step S814), and then update the voice learning data 192 stored in the learning data storage portion 190 (Step S815). When the voice learning data 192 is updated, the control portion 110 functions as the learning portion 170 to learn the voice of the user based on the voice learning data 192 after updated (Step S816). The processing of Step S814 to Step S816 is the same as the processing of Step S801 to Step S803 illustrated in FIG. 8, and therefore a description thereof is omitted. Thus, the voice learning processing illustrated in FIG. 10 is completed.

The face learning processing in Step S9 can also be described similarly to the voice learning processing illustrated in FIG. 10. More specifically, in Step S9, the control portion 110 acquires face image data while interacting with a user in place of the face learning processing illustrated in FIG. 9 in Embodiment 1, and then updates the face learning data 191 based on the acquired face image data.

Thus, in the robot 100 according to Embodiment 2, when the identification of the individual by the one identification portion fails and the identification of the individual by the other identification portion succeeds, the robot 100 is caused to perform the motion for interacting with the individual identified by the other identification portion before the updating portion 160 updates the learning data. Then, the robot 100 updates the learning data stored in the learning data storage portion 190 based on the face image data or the voice data acquired in the interaction with the identified individual. This makes it easy to acquire data more suitable as the learning data and notably indicating the feature of the individual as compared with the case of only using the face image data used for the face identification or the voice data used for the voice identification. Therefore, the robot 100 can collect higher quality learning data in a natural behavior of the robot 100 giving no uncomfortable feeling to a user.

Embodiment 3

Next, Embodiment 3 of the present invention is described.

In Embodiments 1 and 2 above, the learning portion 170 learns one identification method in the face identification portion 140 and one identification method in the voice identification portion 150 for one individual. However, the feature of the face or the voice changes in some cases according to the situation even in the same user. Therefore, in Embodiment 3, the learning portion 170 learns an identification method of an individual in each of the face identification portion 140 and the voice identification portion 150 for each condition when each of a plurality of conditions is established.

The robot 100 according to Embodiment 3 is provided with a learning data storage portion 190a illustrated in FIG. 11, for example, in place of the learning data storage portion 190 illustrated in FIG. 4. As illustrated in FIG. 11, the learning data storage portion 190a stores the face learning data 191, the voice learning data 192, the face identification data 193, and the voice identification data 194 for each of a plurality of individuals while dividing periods into two periods of "Spring" and "Periods other than spring". Herein, the "Spring" is equivalent to the term of March to June, for example, and the "Periods other than spring" are equivalent to the other terms. However, the definition of the periods can be changed as appropriate.

As described above, the learning data and the identification data are divided according to the "Spring" and the "Periods other than spring". This is because a user wears a mask due to factors, such as pollen allergy, in the "Spring" in many cases, and thus the features of face images are different between a case of wearing a mask and a case of not wearing a mask even in the same user. This is also because the features are similarly different also in a voice due to factors, such as pollen allergy, even in the same user.

When the identification of an individual by one identification portion of the face identification portion 140 and the voice identification portion 150 fails and the identification of the individual by the other identification portion succeeds, the updating portion 160 updates the face learning data 191 or the voice learning data 192 stored in the learning data storage portion 190a based on face image data or voice data acquired by the one identification portion. At this time, the updating portion 160 updates the learning data different from each other according to whether the period when the face image data or the voice data is acquired is the "Spring" or the "Periods other than spring".

Specifically, a case where the face learning data 191 of an individual having a name of "AAA" is updated is described. A case where the voice learning data 192 is updated can also be similarly described. The updating portion 160 updates "Data A01" in FIG. 11 in case that the period when the face image data is acquired is the "Spring" and updates "Data A11" in FIG. 11 in case that the period when the face image data is acquired is the "Periods other than spring". The learning portion 170 learns two kinds of identification methods different from each other based on each of two kinds of face learning data 191 stored in the learning data storage portion 190a. The two kinds of learned identification methods are stored in the learning data storage portion 190a as the two kinds of face identification data 193 different from each other (for example, "Data A03" and "Data A13" in FIG. 11).

When acquiring new face image data indicating the individual by the imaging portion 115*a*, the face identification portion 140 identifies the individual based on one identification method corresponding to the period when the new face image data is acquired of the two kinds of identification methods learned by the learning portion 170. For example, when the new face image data is acquired in the "Spring", the face identification portion 140 identifies the individual based on the identification method for the "Spring" and when the new face image data is acquired in the "Periods other than spring", the face identification portion 140 identifies the individual based on the identification method for the "Periods other than spring".

Thus, the robot 100 and the identification device 120 according to Embodiment 3 learn a plurality of kinds of individual identification methods in the face identification portion 140 and the voice identification portion 150 according to the period. Then, when the new face image data or voice data indicating the individual is acquired, the individual is identified based on one identification method corresponding to the period when the new face image data or voice data is acquired among the plurality of kinds of identification methods. Thus, even when the feature of the individual changes according to the situation, the identification failure can be suppressed, and therefore the identification accuracy can be further improved.

As the way of dividing the periods of the learning data stored in the learning data storage portion 190*a*, the periods of the learning data may be divided into "Daytime" or "Night" without being limited to the "Spring" or the "Periods other than spring". Alternatively, the learning data may be divided according to various conditions other than the periods, such as the surrounding environment and a user's situation, for example. Moreover, while the learning portion 170 learns an individual identification method only in one identification portion of the face identification portion 140 and the voice identification portion 150 for each predetermined condition, the learning portion 170 may learn an individual identification method in the other identification portion without being divided for each condition, i.e., by the same method as that of Embodiments 1 and 2. In other words, when each of the plurality of conditions is established, the learning portion 170 learns an individual identification method in at least one identification portion of the plurality of identification portions for each predetermined condition. Then, when acquiring new data indicating an individual, the at least one identification portion identifies the individual based on one identification method corresponding to the condition when the new data is acquired among a plurality of identification methods corresponding to the plurality of conditions learned by the learning portion 170.

(Modification)

Although the embodiments of the present invention are described above, the embodiments are examples and the scope of the present invention is not limited thereto. More specifically, the embodiments of the present invention can be variously applied and all embodiments are included in the scope of the present invention.

For example, in the embodiments above, the robot 100 for home use is provided with the identification device 120. However, in the present invention, the identification device 120 may be disposed in devices other than the robot 100 and may be used for applications other than the robot 100. For example, the identification device 120 may be disposed in the entrance of a building or a room to be used for the application of identifying (authenticating) a user entering the building or the room. Alternatively, the identification device 120 may be mounted in information devices, such as a personal computer and a smartphone, to be used for the application of identifying (authenticating) a user using the information devices.

In the embodiments above, the robot 100 is provided with the learning data storage portion 190 and the learning portion 170 as a part of the identification device 120. However, in the present invention, the learning data storage portion 190 and the learning portion 170 may not be provided in the robot 100. In other words, a device provided with the face identification portion 140 and the voice identification portion 150 and a device provided with the learning data storage portion 190 and the learning portion 170 may be separate devices.

Figure 12:
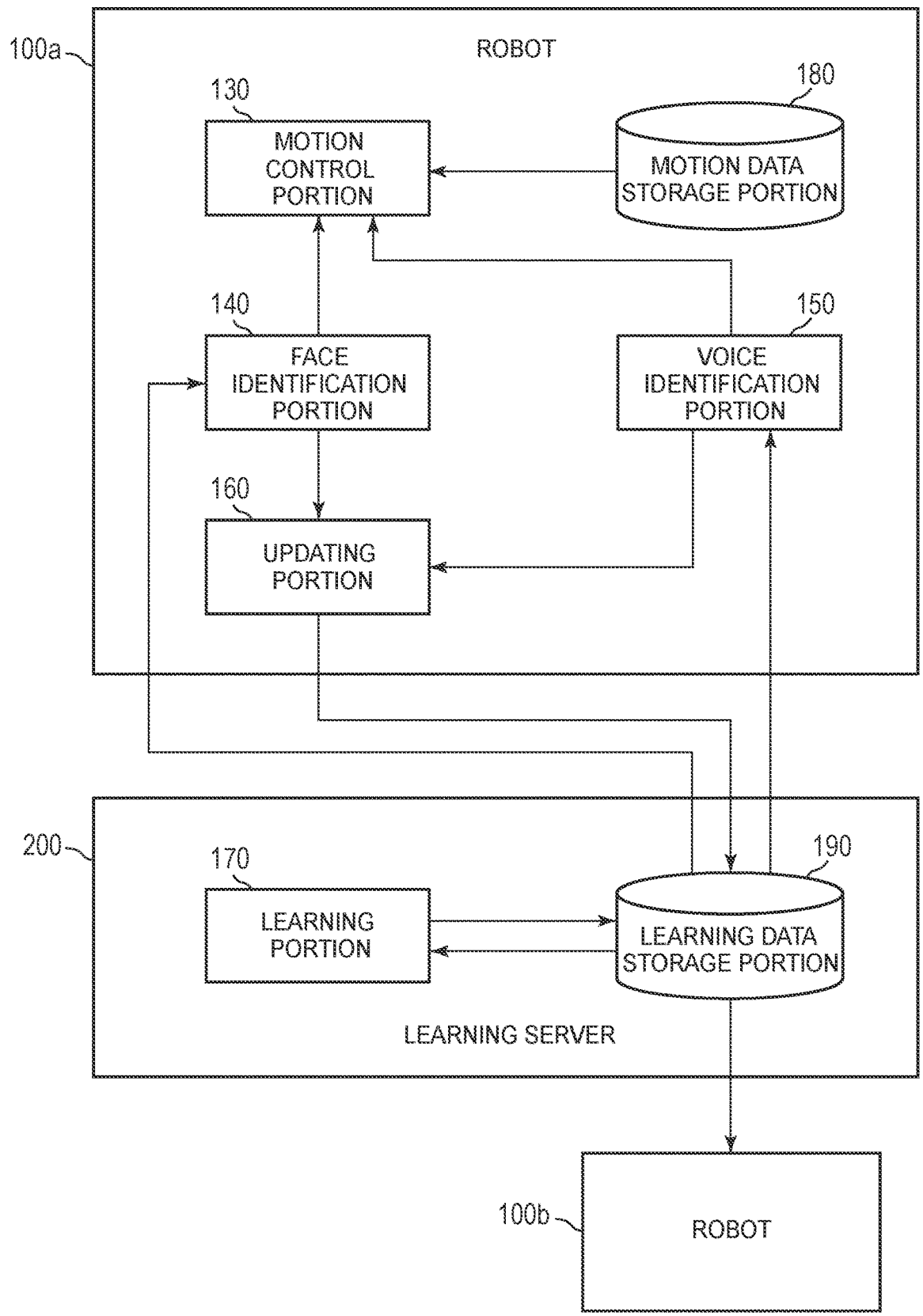
FIG. 12 is a block diagram illustrating the functional configurations of a robot and a server device in a modification of the present invention.

For example, as illustrated in FIG. 12, the learning data storage portion 190 and the learning portion 170 may not be provided in a robot 100*a* and may be provided in a learning server 200 outside the robot 100*a*. The learning server 200 is a server communicatively connected to the robot 100*a* by a wide area network, such as a cloud server. In this case, the face identification portion 140, the voice identification portion 150, and the updating portion 160 in the robot 100*a* and the learning portion 170 and the learning data storage portion 190 in the learning server 200 function as the identification device 120 by cooperation thereof.

In the robot 100*a* illustrated in FIG. 12, the updating portion 160 communicates with the learning server 200 through the wireless communication portion 116 to thereby update the face learning data 191 or the voice learning data 192 stored in the learning data storage portion 190. In the learning server 200, when the face learning data 191 or the voice learning data 192 stored in the learning data storage portion 190 (see FIG. 3) is updated, the learning portion 170 learns identification methods in the face identification portion 140 and the voice identification portion 150 based on the face learning data 191 or the voice learning data 192 after updated. In the robot 100*a*, the face identification portion 140 receives the face identification data 193 indicating a result learned by the learning portion 170 from the learning server 200, and then identifies an individual based on the received face identification data 193. The voice identification portion 150 receives the voice identification data 194 indicating a result learned by the learning portion 170 from the learning server 200, and then identifies an individual based on the received voice identification data 194. Thus, by carrying out the learning processing by the learning portion 170 having a relatively high load outside the robot 100*a*, a calculation load in the robot 100*a* can be reduced, and thus the configuration of the robot 100*a* can be simplified.

As illustrated in FIG. 12, another robot 100*b* other than the robot 100*a* may use the result learned by the learning portion 170. In other words, the other robot 100*b* having the same functions as those of the robot 100*a* may receive the face identification data 193 and the voice identification data 194 learned in the learning server 200 from the learning server 200, and then identify an individual based on the received face identification data 193 and voice identification data 194. Thus, by allowing also a device (robot 100*b*) different from a device (robot 100*a*) collecting the face image data and the voice data serving as the basis for the learning to use the learning result, the convenience is improved.

In the embodiments above, the face identification portion 140 and the voice identification portion 150 identify an individual from the plurality of individuals whose learning data are stored in the learning data storage portion 190 based on face image data and voice data, respectively. However, only learning data of one individual may be stored in the learning data storage portion 190. In this case, the face identification portion 140 and the voice identification portion 150 identify whether an individual whose face or voice is detected corresponds to one individual whose learning data is stored in the learning data storage portion 190 to thereby authenticate the individual. In other words, the identification of an individual by the face identification portion 140 and the voice identification portion 150 may also include so-called authentication of the individual.

In the embodiments above, the face identification portion 140 identifies an individual by a face image and the voice identification portion 150 identifies an individual by a voice. However, the combination of the identification by the face identification portion 140 and the identification by the voice identification portion 150 is not limited thereto. The face identification portion 140 and the voice identification portion 150 may identify an individual based on data indicating the features other than the face image or the voice insofar as the data are data indicating the features different from each other.

Moreover, the robot 100 and the identification device 120 may be provided with a third identification portion other than the face identification portion 140 and the voice identification portion 150. The third identification portion may be a retina identification portion identifying an individual by the retina as an example. Even in the case where the robot 100 and the identification device 120 are provided with three or more identification portions (identification units), the same configurations as those of the embodiments above are applicable. More specifically, the robot 100 and the identification device 120 may be provided with three or more identification portions individually acquiring data different from each other indicating an individual, and then identifying the individual based on the acquired data. In this case, when the identification of the individual by one or more identification portions of the three or more identification portions fails and the identification of the individual by one or more other identification portions of the three or more identification portions fails, the learning portion 170 leans individual identification method(s) in any one or more identification portions by which the identification of the individual fails.

When specifically described, in a case where the identification of an individual by two or more identification portions of the three or more identification portions fails and the identification of the individual is identified by the other one identification portion succeeds, the learning portion 170 may learn an individual identification method in each of the two or more identification portions by which the identification of the individual fails. This case can be described similarly to the embodiments above on the assumption that the two or more identification portions by which the identification of the individual fails correspond to the one or more identification portions in the embodiments above and the one identification portion by which the identification of the individual succeeds corresponds to the one or more other identification portions in the embodiments above.

Alternatively, when the identification of an individual by one identification portion of the three or more identification portions fails and the identification of the individual by two or more other identification portions succeeds, the learning portion 170 may learn an individual identification method in the one identification portion by which the identification of an individual fails. This case can be described similarly to the embodiments above on the assumption that the one identification portion by which the identification of the individual fails corresponds to the one identification portion in the embodiments above and the two or more identification portions by which the identification of the individual succeeds correspond to the other identification portion in the embodiments above.

Moreover, when updating the face learning data 191 or the voice learning data 192 stored in the learning data storage portion 190, the updating portion 160 may exclude the learning data acquired before a predetermined time from the present time from the teacher data learned by the learning portion 170. By excluding data having old acquisition time from the teacher data as described above, the identification performance to the present state of a user can be improved.

In the embodiments above, the robot 100 is a robot imitating a dog. However, the robot 100 according to the present invention may have any shape. For example, the robot 100 according to the present invention may imitate other animals or may imitate a human being in appearance. Moreover, the display portion 117 may be provided in places other than the eye portions 104. The imaging portion 115a may be provided in a place (for example, nose portion or the like) other than the mouth portion 105. The other portions are also not limited to the aspects described in the embodiments above.

In the embodiments above, the CPU executes the programs stored in the ROM in the control portion 110, whereby the control portion 110 functions as the portions illustrated in FIG. 3. However, in the present invention, the control portion 110 may be provided with dedicated hardware, such as an ASIC (Application Specific Integrated Circuit), an FPGA (Field-Programmable Gate Array), or various control circuits, for example, in place of the CPU and the dedicated hardware may function as the portions illustrated in FIG. 3. In this case, each of the functions of the portions may be realized by individual hardware or the functions of the portions may be collectively realized by single hardware. Alternatively, some of the functions of the portions may be realized by the dedicated hardware and the other functions may be realized by software or firmware. Main bodies carrying out each function including the dedicated hardware and the CPU can be generically referred to as a processor.

Although it is a matter of course that an identification device or a robot provided beforehand with the configurations for realizing the functions according to the present invention can be provided, existing information processing devices and the like can be functioned as the identification device or the robot according to the present invention by the application of programs. More specifically, the programs for realizing functional configurations by the identification device 120 or the robots 100, 100a described above as an example in the embodiments are applied so as to be executable by the CPU or the like controlling the existing information processing devices and the like, whereby the existing information processing devices and the like can be functioned as the identification device or the robot according to the present invention.

Moreover, application methods of such programs are arbitrary methods. The programs are applicable by being stored in a storage medium which can be read by a computer, such as a flexible disk, a CD (Compact Disc)-ROM, a DVD (Digital Versatile Disc)-ROM, or a memory card, for example. Furthermore, the programs are applicable through a communication medium, such as the Internet, by being superimposed on a carrier wave. For example, the program may be posted and distributed on the Bulletin Board System (BBS) on a communication network. A configuration may be acceptable in which the processing above can be carried out by starting the program, and then executing the program in the same manner as in the other application programs under the control of the OS (Operating System).

As described above, preferable embodiments of the present invention are described. However, the present invention is not limited to the specific embodiments and the present invention includes the inventions described in CLAIMS and the equivalent scope thereto.

What is claimed is:

1. An identification device comprising:
   a processor configured to:
   carry out a plurality of types of identification processing by which an individual is identified based on acquired data of a plurality of different types indicating the individual, and
   in a case in which (i) the identification of the individual fails by at least one type of identification processing from among the plurality of types of identification processing and (ii) the identification of the individual succeeds by at least one other type of identification processing from among the plurality of types of identification processing, judge that the identification of the individual was successful, and learn the at least one type of identification processing by which the identification of the individual failed.

2. The identification device according to claim 1, wherein the processor is configured to learn the at least one type of identification processing by which the identification of the individual failed using data acquired in the at least one type of identification processing by which the identification of the individual failed from among the plurality of different types of acquired data.

3. The identification device according to claim 2, wherein the data used for the learning of the at least one type of identification processing by which the identification of the individual failed comprises the data used for the identification of the individual when the identification of the individual failed in the at least one type of identification processing.

4. The identification device according to claim 1, further comprising:
   a memory in which a plurality of pieces of learning data each indicating a respective different feature of the individual are stored in association with the individual,
   wherein the processor is configured to:
   in the case in which the identification of the individual fails by the at least one type of identification processing and the identification of the individual succeeds by the at least one other type of identification processing, update the piece of learning data corresponding to the at least one type of identification processing by which the identification of the individual failed from among the plurality of pieces of learning data stored in the memory, and
   learn the at least one type of identification processing by which the identification of the individual failed based on the updated piece of learning data.

5. The identification device according to claim 4, wherein the processor is configured to, in the case in which the identification of the individual fails by the at least one type of identification processing and the identification of the individual succeeds by the at least one other type of identification processing, update the piece of learning data corresponding to the at least one type of identification processing by which the identification of the individual failed from among the plurality of pieces of learning data stored in the memory based on data acquired in the at least one type of identification processing by which the identification of the individual failed from among the plurality of different types of acquired data.

6. The identification device according to claim 4, wherein:
   the plurality of pieces of learning data are stored in association with each of a plurality of individuals in the memory, and
   the processor is configured to, in the case in which the identification of the individual fails by the at least one type of identification processing and the identification of the individual succeeds by the at least one other type of identification processing, update the piece of learning data associated with the individual identified by the at least one other type of identification processing from among the plurality of pieces of learning data stored in the memory, for each of the plurality of individuals.

7. The identification device according to claim 1, wherein the plurality of types of identification processing include face identification processing identifying the individual based on acquired face image data indicating a face of the individual and voice identification processing identifying the individual based on acquired voice data indicating a voice of the individual.

8. The identification device according to claim 7, wherein in the face identification processing, when a plurality of face images are contained in the face image data, a face image in which a lip is moving during a period of time when the voice data is acquired in the voice identification processing from among the plurality of face images is determined to be a face image of the individual whose voice data is acquired.

9. The identification device according to claim 1, wherein:
   when each of a plurality of conditions is established, the processor is configured to learn at least one type of identification processing from among the plurality of types of identification processing for each of the conditions, and
   in the at least one type of identification processing, when new data indicating the individual is acquired, the individual is identified based on a type of identification processing corresponding to the condition when the new data is acquired from among the plurality of learned types of identification processing corresponding to the plurality of conditions.

10. A robot comprising:
    a processor,
    wherein the processor is configured to:
    carry out a plurality of types of identification processing identifying an individual based on acquired data of a plurality of different types indicating the individual,
    when the identification of the individual by at least one type of identification processing from among the plurality of types of identification processing succeeds, cause the robot to perform a motion according to the identified individual, and
    in a case in which (i) the identification of the individual fails by at least one type of identification processing from among the plurality of types of identification processing and (ii) the identification of the individual succeeds by at least one other type of identification processing from among the plurality of types of identification processing, judge that the identification of the individual was successful, and update learning data for learning the at least one type of identification processing by which the identification of the individual failed.

11. The robot according to claim 10, wherein the processor is configured to:

in the case in which the identification of the individual fails by the at least one type of identification processing and the identification of the individual succeeds by the at least one other type of identification processing, cause the robot to perform a motion for interacting with the individual identified by the at least one other type of identification processing, and in the case in which the identification of the individual fails by the at least one type of identification processing and the identification of the individual succeeds by the at least one other type of identification processing, update the learning data based on a response of the individual to the motion performed by the robot.

12. An identification method comprising:

identifying an individual based on acquired data of a plurality of different types indicating the individual, and in a case in which (i) the identification of the individual fails by at least one piece of the acquired data and (ii) the identification of the individual succeeds by at least one other piece of the acquired data, judging that the identification of the individual was successful, and learning an identification method of the individual using the at least one piece of the acquired data by which the identification of the individual failed.

13. A non-transitory computer-readable storage medium storing a program executable by a computer to control the computer to execute processes comprising:

carrying out a plurality of types of identification processing identifying an individual based on acquired data of a plurality of different types indicating the individual; and in a case in which (i) the identification of the individual fails by at least one type of identification processing from among the plurality of types of identification processing and (ii) the identification of the individual succeeds by at least one other type of identification processing from among the plurality of types of identification processing, judging that the identification of the individual was successful, and learning the at least one type of identification processing by which the identification of the individual failed.

* * * * *